United States Patent [19]

Essebaggers

[11] 4,226,012
[45] Oct. 7, 1980

[54] METHOD OF REPAIRING A HEAT EXCHANGER AND BODY FOR USE IN THIS METHOD

[75] Inventor: Jan Essebaggers, Nieuwerkerk aan de IJssel, Netherlands

[73] Assignee: B.V. Neratoom, The Hague, Netherlands

[21] Appl. No.: 946,457

[22] Filed: Sep. 27, 1978

Related U.S. Application Data

[63] Continuation of Ser. No. 727,627, Sep. 8, 1976, abandoned.

[30] Foreign Application Priority Data

Oct. 6, 1975 [NL] Netherlands ........................ 7511726

[51] Int. Cl.$^3$ ........................ B23P 9/00; B23P 15/26
[52] U.S. Cl. ........................ 29/157.3 R; 29/157.4; 29/401.1; 29/402.08
[58] Field of Search ........... 29/157.3 R, 157.4, 401 B, 29/401 F, 401 R, 401.1, 402.01, 402.08, 402.09; 165/172, 173

[56] References Cited

U.S. PATENT DOCUMENTS

| 3,111,168 | 11/1963 | Huet | 165/172 |
| 3,249,154 | 5/1966 | Legrand | 165/172 |
| 3,488,829 | 1/1970 | Boniface | 228/119 |
| 3,555,656 | 1/1971 | Brown et al. | 29/157.3 R |
| 3,807,024 | 4/1974 | Harvey et al. | 29/157.4 |
| 3,964,146 | 6/1976 | Vestre et al. | 29/157.4 |

FOREIGN PATENT DOCUMENTS 7501372  8/1976  Netherlands ........................... 29/157.4

Primary Examiner—Daniel C. Crane

[57] ABSTRACT

A method of repairing a heat exchanger comprising a housing within which a plurality of spaced apart tubes extend. The method comprises the steps of, once a leak in one of the tubes has been detected, sealing the defective tube at both ends, cutting the defective tube adjacent the ends, removing the tube and mounting a body of suitable shape in its place, thereby ensuring that a proper temperature distribution occurs in the vicinity of the body during operation of the heat exchanger.

2 Claims, 2 Drawing Figures

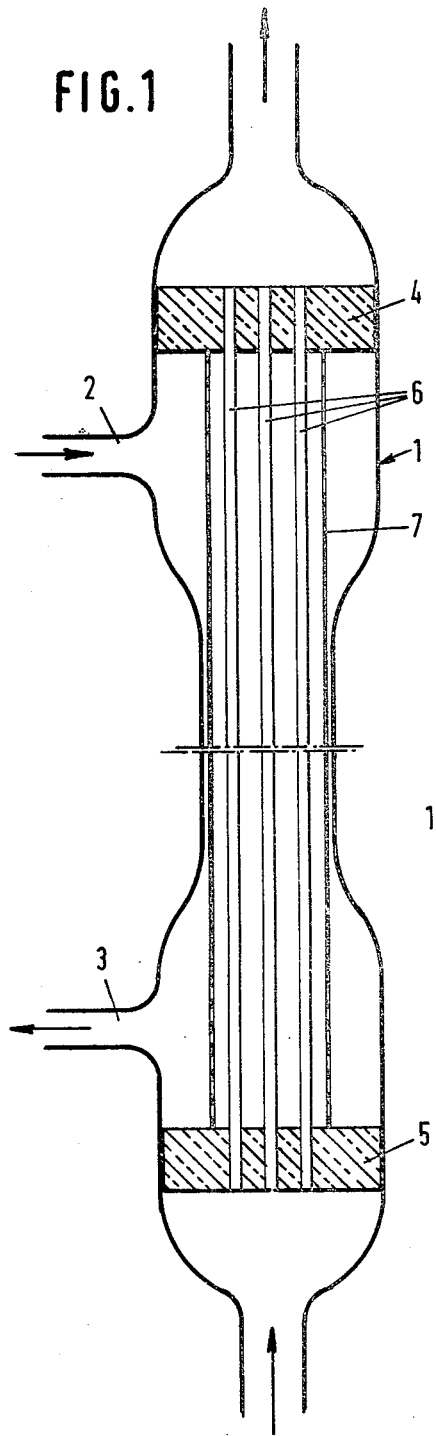
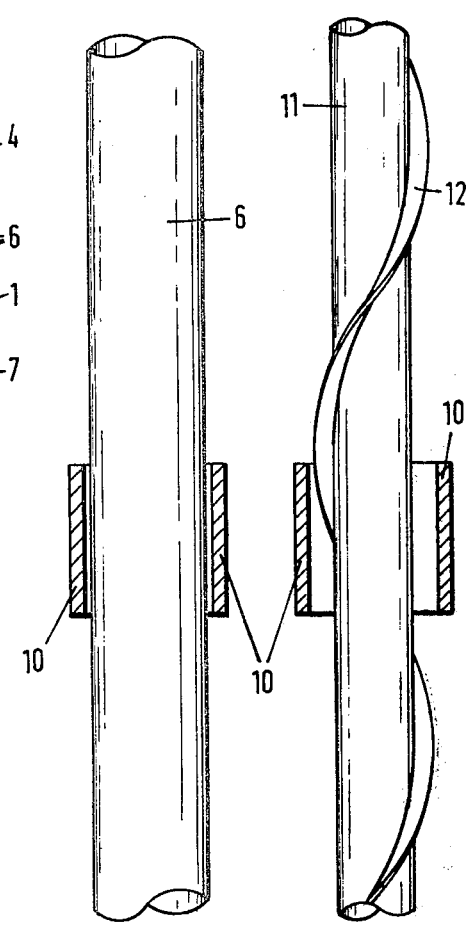
FIG. 1
FIG. 2

METHOD OF REPAIRING A HEAT EXCHANGER AND BODY FOR USE IN THIS METHOD

This is a continuation of application Ser. No. 727,627, filed Sept. 8, 1976, now abandoned.

The invention relates to a method of repairing a heat exchanger comprising a housing defining an elongated enclosure in which a plurality of spaced apart tubes is arranged for passing a fluid, vapour or gas through the heat exchanger, which exchanger further comprises means for passing a hot medium through the enclosure surrounding the tubes so as to establish a heat exchange with the fluid, vapour or gas passed through the tubes, which method comrises the steps of, in the event of leakage of one of the tubes, sealing the defective tube at both ends to terminate the flow of the fluid, vapour or gas therethrough, the tube being cut through at one of its ends.

Such a method is described in the now published Dutch patent application No. 75,01372. In accordance with this prior proposal, the defective tube is cut through at one end in order to enhance its accessibility to the hot medium and prevent the occurrence of thermal stresses after this tube has been disconnected from the heat exchange system, while at its other end the tube is provided with apertures permitting the hot medium to flow through the tube during operation of the heat exchanger. Furthermore, a flow guide is mounted within the sealed tube to ensure that the entire tube wall is in contact with the flowing hot medium. This promotes the detection of leaks that may occur during subsequent use of the device.

The present invention provides a different method of repairing a heat exchanger, in which the defective tube is cut through at a corresponding place at the other end and the thus severed tube section is removed from the heat exchanger and, to replace this section, a body is mounted in the heat exchanger which has a structure so that during operation a proper mixing occurs between the hot medium flowing in the vicinity of the body and the hot medium flowing elsewhere in the enclosure surrounding the tubes.

An advantage of the method according to the invention resides in the fact that, seen in a plane normal to the body replacing the defective tube, a more uniform temperature distribution occurs than when the defective tube would have been left in place. It is true that, with the defective tube maintained, the hot medium flows through and along this tube but, unlike at the non-defective tubes, this medium is unable to give up heat to the other medium (fluid, vapour or gas) passed through the device. Thus the temperature at the defective tube will be higher than that at corresponding places adjacent non-defective tubes. As a result thereof, seen in a plane normal to the defective tube a "hot spot" will exist at this defective tube, which may cause thermal stresses and thus lead to tubes adjacent the defective tube becoming defective too.

In accordance with the present invention this is avoided as the defective tube is replaced by a body having a shape so that no laminar flow along the body is possible. The structure of the body employed in accordance with the present invention is actually such that turbulences are created in the flow, as a result whereof the medium flowing adjacent the body and incapable of giving up heat to the fluid, vapour or gas passing through the non-defective tubes moves away from the body to mix with medium flowing along adjacent tubes. In a preferred embodiment of the present invention the body is essentially an elongated hollow tube or rod having a helical collar mounted on its outer circumference.

In the embodiment employing a hollow tube as the body promoting the mixing, this tube may be provided at both its ends with a flow guide in the manner described in the aforesaid Dutch patent application No. 75,01372.

The invention will be described in detail hereinafter with reference to the accompanying drawing, in which:

FIG. 1 schematically shows a cross-sectional view of a heat exchanger which can be repaired by the method according to the invention, and FIG. 2 shows a cross-sectional view of a part of the heat exchanger repaired by the method according to the invention.

In the heat exchanger shown in cross-section in FIG. 1, which may for example be a steam generator, the elongated housing 1 is essentially a hollow cylinder. The cylinder comprises a supply conduit 2 and a discharge conduit 3 spaced therefrom. A hot medium e.g. fluid sodium heated in the core of a nuclear reactor, is introduced through conduit 2 into cylindrical housing 1 and, after having flowed through the housing 1, is discharged through conduit 3. A tube plate 4 is mounted within housing 1 at its top end to separate the space below the plate from the space above the plate. Similarly, a tube plate 5 is mounted within housing 1 at its bottom end to separate the space below the plate from that above the plate. The hot medium flows through the space between the tube plates. A plurality of tubes 6 is mounted in essentially parallel relationship between the tube plates 4 and 5 to extend within the space through which the hot medium flows. The tubes 6 have their bottom ends secured to tube plate 5 and their top ends to tube plate 4 to thus place the space below tube plate 5 into communication with the space above tube plate 4. During operation of the heat exchanger a medium of a temperature lower than that of the hot medium, for example water, is passed from the space below plate 5 through pipes 6 to the space above plate 4. In the space between plates 4 and 5 the hot medium gives up heat to the cooler medium in tubes 6, thereby heating this cooler medium. In a steam generator the water passed through tubes 6 is converted to steam leaving the device at the top end. To ensure a proper flow of the hot medium around all tubes 6, usually the device is provided with a cylindrical shield 7 surrounding tubes 6. This shield 7 has its peripheral wall apertured at the top and bottom ends. By means of shield 7 the hot medium is forced into full flowing contact with tubes 6 on its way from supply conduit 2 to discharge conduit 3.

During operation one of tubes 6 may become leaky. This is undesirable, particularly in devices in which the hot medium is fluid sodium and the medium in the tubes is water. As soon as the existence of a leak has been detected, measures are taken to seal the defective tube. As stated above, Dutch patent application No. 75,01372 describes a method of sealing defective tubes in a heat exchanger. The sealing of defective tubes usually comprises the provision of a stop or plug at the ends of the defective tube above and below the respective tube plates or in these tube plates. In accordance with the present invention, after the tube has been plugged at both ends or, if desired, after the tube has been plugged at one end and prior to plugging the other end, the defective tube is cut through at both ends adjacent the respective tube plates and the severed tube section is removed from the device.

The removed section is now replaced by a body having a structure to guarantee a proper mixing of the hot medium surrounding this body and the hot medium surrounding the remaining tubes, thereby preventing considerable temperature differences from occurring in the hot medium as regarded in a horizontal plane.

FIG. 2 shows a cross-sectional view of a small part of the device shown in FIG. 1, after a defective tube has been plugged by the method according to the invention and the major part of this tube has been replaced by a body promoting the mixing of the hot medium. The Figure shows part of a non-defective tube 6. This tube 6 is kept in place by a support 10. Though not shown in FIG. 1, the device comprises such supports for each tube. Next to tube 6 FIG. 2 shows a body 11 replacing a removed defective tube, which body 11 is essentially an elongated hollow tube. This tube has a collar 12 mounted helically about its circumference. Body 11 with collar 12 is likewise kept in place by a support 10.

During operation of the heat exchanger the hot medium flows along tube 6 and body 11 in downward direction. The shape of body 11 and the collar 12 mounted thereon prevent laminar flow along the body and force the hot medium to flow into directions other than the perpendicular one. Thus a mixing of the medium flowing along body 11 and that flowing elsewhere is promoted and the medium flowing along body 11, which medium is not cooled by the medium in tubes 6, is prevented from getting a too high temperature. Consequently, regarded in a horizontal plane, a more uniform temperature distribution is achieved than when body 11 would be absent. Thus the presence of this body 11 prevents the occurrence of undesired, high temperatures in the device at the defective tube, which high temperatures might otherwise lead to considerable stresses in tubes adjacent the defective one and thus to these tubes becoming defective too.

It will be clear that the shape of body 11 with collar 12 is not limited to the configuration shown in FIG. 2 but that any shape ensuring a proper mixing of the hot medium may be used.

I claim:

1. A method of repairing a heat exchanger having a housing defining an elongated enclosure in which a plurality of spaced apart tubes is arranged for passing a fluid, vapour or gas through the heat exchanger, and means for passing a hot medium through the enclosure surrounding the tubes so as to establish a heat exchange with the fluid, vapour or gas passed through the tubes, in the event of leakage of one of the tubes said method comprising the steps of sealing the defective tube at both ends to terminate the flow of said fluid, vapour or gas therethrough, cutting the defective tube through adjacent one of its ends, cutting the defective tube through at a corresponding place at the other end thereof, said steps of cutting being perfomed intermediate the sealed ends of said tube removing the thus severed tube section from the heat exchanger, and replacing said severed tube section by mounting a body in the heat exchanger having a structure so that during operation a proper mixing occurs between the hot medium flowing in the vicinity of the body and the hot medium flowing elsewhere in the enclosure surrounding the tubes, said body having means for creating nonlaminar flow of the hot medium along the body.

2. A method according to claim 1, comprising using a body which is essentially an elongated hollow tube or rod having a helical collar mounted on its outer circumference.

* * * * *